No. 888,956. PATENTED MAY 26, 1908.
R. BATTISTONI & R. ROTELLI.
PROCESS FOR THE MANUFACTURE OF OXYCARBID OF BARIUM.
APPLICATION FILED JAN. 14, 1905.
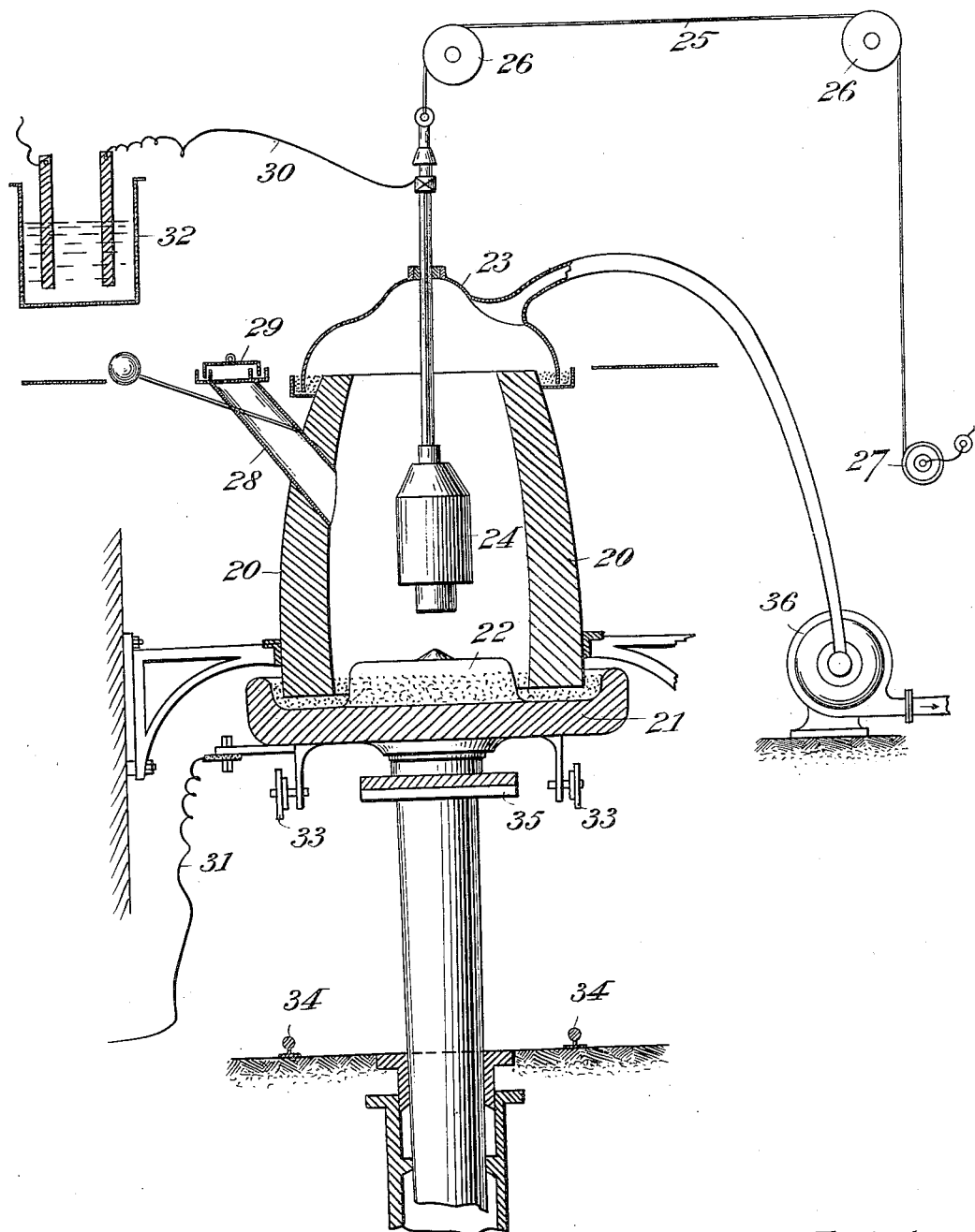
Witnesses:  
Edwin L. Yewell  
Walter Allen
Inventors:  
Rodolfo Battistoni and Romolo Rotelli.  
By W. C. Schoenborn  
Attorney.

UNITED STATES PATENT OFFICE.

RODOLFO BATTISTONI, OF ANCONA, AND ROMOLO ROTELLI, OF VENICE, ITALY.

PROCESS FOR THE MANUFACTURE OF OXYCARBID OF BARIUM.

No. 888,956.　　　　Specification of Letters Patent.　　　Patented May 26, 1908.

Application filed January 14, 1905. Serial No. 241,155.

*To all whom it may concern:*

Be it known that we, RODOLFO BATTISTONI and ROMOLO ROTELLI, both subjects of the King of Italy, and residents, the former of Ancona, Italy, and the latter of Venice, Italy, have invented a certain new and useful Process for the Manufacture of Oxycarbid of Barium, of which the following is a specification.

The object of this invention is a process for the manufacture of a new product which is composed of a mixture of 10 to 12 per cent. $BaC_2$, 3 to 5 per cent. $Ba(CN)_2$, 80 to 85 per cent. $BaO$. This product of oxycarbid of barium is designated by the name "baryundum." It is distinguished from $BaC_2$, as well as from $BaO$ by its color; its crystalline structure, the easiness with which it is hydrated and the disengagement of $NH_3$ which is effected by the hydratation of $Ba(CN)_2$. This product is obtained in the electric furnace by the process described hereafter by previously mixing the $BaCO_3$ with extremely fine carbon and submitting it in a hot state to the electrolytic effect of a direct current. The electrolysis of the natural or artificial carbonate of barium in a molten state, and the addition of carbon in a proportion of 3 to 4 per cent. in its finest possible state are the two essential characteristics of our process. The latter has indeed nothing in common with the manufacture of carbid of barium because the latter is not based upon the electrolysis of the carbonate of barium but on the reduction of the $BaCO_3$ by great quantities of coal according to the equation $BaCO_3 + 4C = BaC_2 + 3CO$. It has nothing in common with the manufacture of pure $BaO$ or of $BaO$ mixed with $BaCO_3$ as the latter is obtained with ordinary flame furnaces by a thermic but not by an electrolytic effect. Furthermore the carbon added in the present case plays quite another part than in the cited process.

In the manufacture of carbid of barium the carbon acts as a reducing agent and in the manufacture of oxid of barium only as a combustible with a view of developing and maintaining a determined uniform heat in the mass contained in the furnace. In our process on the contrary the carbon acts as a catalytic substance, as a conducting means for the electric current and offers a whole system of bearing surfaces for the regular development of the ions freed by the current.

The oxycarbid of barium can be manufactured from the natural carbonate of barium as well as from the artificial carbonate obtained in the extraction of sugar from molasses by means of baryta. In the latter case the carbon necessary for the operation ought to be added to the carbonate of barium before the latter is conveyed to the filter process. In this manner cakes are obtained which are composed of an extremely homogeneous mixture of carbon and carbonate of barium which is one of the principal conditions for the good success of the operation in the electric furnace. The cakes thus obtained are dried and immediately introduced into the electric oven.

Referring to the drawing, the electric oven is preferably composed of a metallic envelop 20 lined on its inside with fire resisting brickwork whereupon a mass is extended which is essentially composed of carbonate of barium. The movable bottom 21 receives the lower electrode 22. Connected to the cover 23 is the escape duct for the $CO_2$ gases. The charging of the furnace as well as the maneuvering of the upper electrode 24 are effected in any desired manner in the present case for instance by means of a cable 25 conducted over rollers 26 and which is wound upon a windlass drum 27. The charging of the furnace is effected through a tubular projection 28 closed during the work by means of a tightly applied cover 29.

30 and 31 are current conductors, 32 a liquid rheostat interposed in the circuit.

The movable bottom of the furnace is provided with wheels 33 so that the bottom can be loaded at any desired place with the material to be treated and can then be rolled on rails 34 perpendicularly under the furnace. The rising at the convenient height is effected by means of a hydraulic piston 35 or any other convenient contrivance.

The escape of the oxids of carbon is assisted by a suction device 36 the $CO_2$ whereof is furthermore used after removal of dust and after washing for effecting the decomposition of the saccharate of barium.

The electrolytic treatment is carried out in such a manner that the furnace is first used as a voltaic arc furnace and at the end of the operation as a resistance furnace. In other words, the upper electrode after a good part of the charge has been fused under the influence of the voltaic arc, is lowered into the molten mass. Owing to the electrolytic effect of the direct current used in this instance an energic disengagement of $CO_2$ takes place. This state is continued until the working period is judged terminated, which judgment is arrived at by means of electrical measurements. The regulation of the potential at the binding posts of the furnace is of the utmost importance and the working process must evidently be carried out in both phases in a different manner.

The obtained product is composed, as already stated, of a homogeneous mixture of oxid of barium and carbon with prevalence of the former, and has received in trade the name of "baryundum." In order to increase the proportion of oxid to a maximum figure, it is before all things necessary that the amount of carbon in the cake of carbonate of barium be sufficient for allowing of the catalytic action and the following decomposition of the carbonate taking place. As this special effect of the carbon depends upon the finely divided state wherein the carbon is in the mass, it follows that the more finely divided the carbon, i. e., the finer the introduced amount of carbon is taken, the smaller must be the amount necessary for the complete success of the operation.

In certain cases it would be advantageous to replace the carbon powder by carbon produced by the calcination of the juice of sugar or of other organic substances, this being carried out by retaining in the cakes of carbonate by a more or less long washing operation, that amount of sugar or of organic substances which is necessary for the success of the operation.

The product leaves the furnace in the form of blocks which are allowed to cool in suitable apparatus adapted to allow of the heat disengaged during this cooling operation, being used for drying the carbonate cakes.

We find $Ba(CN)_2$ in our product without any special introducing of the nitrogen. It is supposed that the little quantity of $Ba(CN)_2$ that we find in our finished products is due to the $BaC_2$, which when it is in the state of igneous liquefaction, acts as very strong reducer, and a small part of the nitrogen of the air that leaks inside the furnace in contact with $BaC_2$ combines with it to give $Ba(CN)_2$. The production of this cyanid is nearly constant if mineral barium carbonate (whitherite), is used and increases a little and is variable if barium carbonate taken from the sugar refinery is used, and this is because the carbonate at the moment of its formation carries with it a part of the organic matters that are found in the sugar juices.

It is easily understood from the following explanations how the nitrogen of those substances that come mixed with the carbonate will give completely the formation of $Ba(CN)_2$ in presence of $BaC_2$ in a melted condition.

In our process the different phases of chemical operation are as follows:—$BaCO_3$ + current = $Ba + CO_3$. $CO_3$ does not exist in the free state and it separates in $CO_2$ and O, the atom of oxygen finding itself in immediate contact with the metal Ba, oxidizes it, giving origin to BaO, so:

$BaCO_3$ + current = $Ba + CO_3$ =
$\qquad Ba + CO_2 + O = BaO + CO_2$.

But we have added and well mixed a certain quantity of carbon (4%) so as to carry the action of the current all through the mass.

Gradually the mass transforms from $BaCO_3$ into BaO and $CO_2$, and stops the function of the carbon that under the action of the high temperature combines with BaO, giving place to the formation of $BaC_2$. Such formation is limited and proportional to the quantity of carbon that is contained in the mass. The $BaC_2$, as stated above, in the melted condition, has a very high reducing power, so, for the nitrogen of the air that is in the furnace, and for the nitrogen contained in the organic substances that are introduced in the carbonate, whereby is obtained a certain quantity of $Ba(CN)_2$ changeable between the 2 and 5% according to the quantity of organic matter contained in the barium carbonate.

It is furthermore advantageous with a view of allowing of the electrolytic decomposition of the carbonate of barium being carried out with as small an expense of energy as possible to add to the natural or artificial carbonate 5 to 6 per cent. of a mixture of alkaline salts as for instance those which are obtained by calcining the mother lyes obtained in the extraction of sugar from the molasses. These salts act as a flux powder at the beginning of the operation as they render the mass more liquid and more suitable for the electrolysis, while they act in the following manner in the later course of the operation.

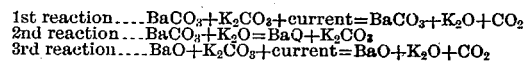

i. e. the $K_2O$ first freed by the current expels the BaO from its combination with the $CO_2$ thus furnishing chemical energy which otherwise would be done by the current. This has as a consequence a considerable saving of electric energy as the electrolyzing action of the current is exerted on $K_2CO_3$ which is always renewed and as a matter of fact is found more easy to electrolyze than the $BaCO_3$.

When we work with the aid of an alkaline carbonate as solvent, the phases of the process first follow the steps last indicated; then after the formation of BaO we have the formation of $BaC_2$ and $Ba(CN)_2$ for the same reasons and in the same manner as first explained.

What we claim as new and desire to secure by Letters Patent is as follows:—

1. A process for the manufacture of a product, oxycarbid of barium, comprising ten to twelve per cent. of carbid of barium, three to five per cent. of cyanamid of barium and eighty to eighty-five per cent. of oxid of barium, which comprises mixing with barium carbonate a determined amount of finely divided carbon, melting the said mixture in an electric furnace and then submitting the melted mixture to the electrolytic action of an electric current.

2. A process of the manufacture of a product, oxycarbid of barium, comprising ten to twelve per cent. of carbid of barium, three to five per cent. of cyanamid of barium and eighty to eighty-five per cent. of oxid of barium which comprises mixing with barium or carbonate a flux, and a determined amount of finely divided carbon, melting the said mixture in an electric furnace and then submitting the melted mixture to the electrolytic action of an electric current.

In testimony whereof we have hereunto set our hands in presence of two witnesses.

RODOLFO BATTISTONI.
ROMOLO ROTELLI.

Witnesses:
VINCENZO SUCCI,
UMBETO NICOLAI.